United States Patent
Han et al.

(10) Patent No.: US 11,787,717 B2
(45) Date of Patent: Oct. 17, 2023

(54) ELECTROCATALYTIC FENTON OXIDATION-ELECTROCHEMICAL OXIDATION COUPLING PROCESS AND APPARATUS FOR EFFICIENT TREATMENT OF CHEMICAL WASTEWATER

(71) Applicant: NANJING UNIVERSITY OF SCIENCE AND TECHNOLOGY, Nanjing (CN)

(72) Inventors: Weiqing Han, Nanjing (CN); Tao Cui, Nanjing (CN); Kajia Wei, Nanjing (CN); Wei Li, Nanjing (CN); Lianjun Wang, Nanjing (CN); Xiaodong Liu, Nanjing (CN); Xiuyun Sun, Nanjing (CN); Jiansheng Li, Nanjing (CN); Jinyou Shen, Nanjing (CN)

(73) Assignee: NANJING UNIVERSITY OF SCIENCE AND TECHNOLOGY, Nanjing (CN)

(*) Notice: Subject to any disclaimer, the term of this patent is extended or adjusted under 35 U.S.C. 154(b) by 302 days.

(21) Appl. No.: 17/057,050

(22) PCT Filed: Feb. 24, 2020

(86) PCT No.: PCT/CN2020/076392
§ 371 (c)(1),
(2) Date: Nov. 19, 2020

(87) PCT Pub. No.: WO2021/159555
PCT Pub. Date: Aug. 19, 2021

(65) Prior Publication Data
US 2022/0048801 A1 Feb. 17, 2022

(30) Foreign Application Priority Data
Feb. 10, 2020 (CN) .......................... 202010084018.X

(51) Int. Cl.
*C02F 9/00* (2023.01)
*C02F 1/461* (2023.01)
(Continued)

(52) U.S. Cl.
CPC .............. *C02F 9/00* (2013.01); *C02F 1/4672* (2013.01); *C02F 1/46109* (2013.01); *C02F 1/66* (2013.01);
(Continued)

(58) Field of Classification Search
CPC ........................................................ C02F 9/00
See application file for complete search history.

(56) References Cited

U.S. PATENT DOCUMENTS

| 6,315,886 B1 * | 11/2001 | Zappi ................... | C02F 1/46109 |
| | | | 204/266 |
| 6,663,781 B1 | 12/2003 | Huling et al. | |
| 2014/0220256 A1 * | 8/2014 | Ogg ........................ | H01M 4/62 |
| | | | 427/126.6 |

FOREIGN PATENT DOCUMENTS

| CN | 101798130 A | 8/2010 |
| CN | 102633322 A | 8/2012 |

(Continued)

OTHER PUBLICATIONS

Machine translation of CN 104261622.*
(Continued)

*Primary Examiner* — Peter Keyworth

(57) ABSTRACT

The present invention discloses an electrocatalytic Fenton oxidation-electrochemical oxidation coupling process and apparatus for efficient treatment of chemical wastewater, and belongs to the field of sewage treatment. The process includes an electrocatalytic Fenton oxidation step, an electrochemical oxidation step, and a pH adjustment step. A spacing between a cathode and an anode in the electrocata-
(Continued)

lytic Fenton oxidation step is controlled, so that oxygen produced at the anode reacts at the cathode to produce $H_2O_2$. The treatment requirements can be met without external aeration or external addition of $H_2O_2$, and meanwhile, the efficiency of COD removal by electro-Fenton oxidation is effectively improved. Further, by connecting a pH adjusting tank with the electrocatalytic Fenton oxidation-electrochemical oxidation coupling apparatus in series, a coupling treatment process with near-zero production of iron sludge is realized.

11 Claims, 5 Drawing Sheets

(51) Int. Cl.
    *C02F 1/467*     (2023.01)
    *C02F 1/66*     (2023.01)
    *C02F 101/34*     (2006.01)
    *C02F 101/38*     (2006.01)
(52) U.S. Cl.
    CPC ............... *C02F 2001/46133* (2013.01); *C02F 2001/46171* (2013.01); *C02F 2101/34* (2013.01); *C02F 2101/38* (2013.01); *C02F 2201/4614* (2013.01); *C02F 2301/046* (2013.01); *C02F 2305/026* (2013.01)

(56) References Cited

FOREIGN PATENT DOCUMENTS

| | | | |
|---|---|---|---|
| CN | 104261622 | A | 1/2015 |
| CN | 105884091 | A | 8/2016 |
| CN | 106315981 | A | 1/2017 |
| CN | 110282706 | A | 9/2019 |
| CN | 110563096 | A | 12/2019 |
| JP | 2017-60942 | A | 3/2017 |

OTHER PUBLICATIONS

Min Cheng et al., "Hydroxyl radicals based advanced oxidation processes (AOPs) for remediation of soils contaminated with organic compounds: A review," Chemical Engineering Journal, Sep. 8, 2015, pp. 582-598.

Wei Shi et al., "Occurrence of estrogenic activities in second-grade surface water and ground water in the Yangtze River Delta, China," Environmental Pollution, May 20, 2013, pp. 31-37.

J. Jing et al., "Photocatalytic degradation of nitrogen-containing organic compounds over Ti02," Journal of Molecular Catalysis A: Chemical, Oct. 7, 2011, pp. 17-28.

C. Zhong et al., "Electrochemical degradation of tricyclazole in aqueous solution using Ti/Sn02—Sb/Pb02 anode," Journal of Electroanalytical Chemistry, Aug. 2, 2013, pp. 68-74.

\* cited by examiner

ELECTROCATALYTIC FENTON OXIDATION-ELECTROCHEMICAL OXIDATION COUPLING PROCESS AND APPARATUS FOR EFFICIENT TREATMENT OF CHEMICAL WASTEWATER

BACKGROUND

Technical Field

The present invention belongs to the technical field of sewage treatment, and more specifically relates to an electrocatalytic Fenton oxidation-electrochemical oxidation coupling process and apparatus for efficient treatment of chemical wastewater.

Related Art

Nitrogenous Heteroaromatic Compounds (NHCs) and Oxygenous Heteroaromatic Compounds (OHCs) are both refractory toxic and harmful organics. NHCs and OHCs, such as cyclic azole, pyrimidine, pyridine and furan compounds, are typical chemical industry compounds widely used in medicine, cosmetics, disinfectants, dyes, pesticides and other industries. The treatment process of fine chemical wastewater produced in production of NHCs and OHCs generally adopts pretreatment processes such as precipitation, air flotation, or chemical redox to improve the biodegradability of wastewater. Then, a series of biological treatment processes are carried out to make the conventional water quality indicators such as COD, ammonia nitrogen and total phosphorus of the wastewater meet the discharge criteria. The effluent (also called "chemical tail water") from secondary biochemical treatment of the fine chemical wastewater produced in the production of NHCs and OHCs generally contains residual refractory nitrogenous heteroaromatic pollutants. Related studies have found that the COD concentration of the chemical tail water discharged after secondary biochemical treatment of the wastewater produced in production of tebuconazole, flutriafol and tricyclazole by a pesticide manufacturer in Jiangsu is 180-250 mg/L. However, the toxicity of the wastewater is still high, with a B/C value of 0.028-0.035, where the concentrations of the toxic factors triazole, tricyclazole and propiconazole are still as high as 10-200 mg/L [C Q Zhong, K J Wei, W Q Han, et al. Electrochemical degradation of tricyclazole in aqueous solution using Ti/SnO$_2$-Sb/PbO$_2$ anode [J]. Journal of Electroanalytical Chemistry, 2013, 705: 68-74]. When these heteroaromatic compounds are discharged into external environmental water bodies, they will stay for a long time and show certain ecological risks and ecological hazards [W Shi, G J Hu, S L Chen, et al. Occurrence of estrogenic activities in second-grade surface water and ground water in the Yangtze River Delta, China [J]. Environmental Pollution, 2013, 181: 31-37]. In recent years, degradation of the nitrogenous heteroaromatic compounds and the oxygenous heteroaromatic compounds and advanced treatment of such tail water have attracted great attention from researchers.

At present, typical physicochemical treatment technologies of chemical wastewater include micro-electrolysis technology and Fenton oxidation technology. These technologies are often used in the design of treatment processes of chemical wastewater and have good treatment effects. When the micro-electrolysis technology is coupled with the Fenton oxidation technology in use, a micro-electrolysis reaction apparatus and a Fenton oxidation reaction apparatus are generally connected in series. Through the coupling of the two technologies, the biological toxicity of wastewater is reduced and the biodegradability of the wastewater is improved, thereby meeting the conditions of subsequent biochemical treatment. The traditional Fenton method in wastewater treatment has the main problems of production of a large amount of iron sludge, serious loss of iron ions, and low iron ion utilization rate. The iron sludge produced by the Fenton oxidation process is a type of hazardous solid waste, which requires costly subsequent treatment.

Electro-Fenton technology has been developed from electrochemical oxidation technology (AO, AO-H$_2$O$_2$) since the 1980s, belongs to the combined technology of EAOPs and Fenton, and is a novel, efficient and clean electrochemical oxidation technology [Jing J, Liu M, Colvin V L, et al. Photocatalytic degradation of nitrogen-containing organic compounds over TiO$_2$ [J]. Journal of Molecular Catalysis A: Chemical, 2011, 351: 17-28]. Different from the traditional Fenton technology, the electro-Fenton technology has an important reactant H$_2$O$_2$ which comes from reduction of external aeration on a cathode. Besides AO-H$_2$O$_2$, a Fenton's reagent (Fe$^{2+}$) is added in the process to activate H$_2$O$_2$, make Fenton reaction occur, and generate hydroxyl radicals to degrade pollutants.

$$O_2 + 2e^- + 2H^+ \rightarrow H_2O_2 \quad (1)$$

$$Fe^{2+} + H_2O_2 \rightarrow Fe^{3+} + \cdot OH + OH^- \quad (2)$$

During the electro-Fenton oxidation reaction, the research group of Enric Brillas at the University of Barcelona in Spain found the following reactions:

$$[Fe(OH)]^{2+} + h\nu \rightarrow Fe^{2+} + \cdot OH \quad (3)$$

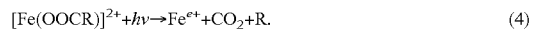

$$[Fe(OOCR)]^{2+} + h\nu \rightarrow Fe^{e+} + CO_2 + R. \quad (4)$$

That is, the refractory intermediate, iron complexes, produced in the electro-Fenton process, such as iron(III)-carboxylate complexes, has a very slow degradation rate [Cheng M, Zeng G, Huang D, et al. Hydroxyl radicals based advanced oxidation processes (AOPs) for remediation of soils contaminated with organic compounds: A review [J]. Chemical Engineering Journal, 2016, 284: 582-598], which severely restricts large-scale promotion and efficient catalysis of the electro-Fenton technology.

It is reported in a literature that when the photoelectro-Fenton oxidation process is used to treat micro-polluted wastewater, the current efficiency even reaches 425% or more. This is due to the improvement of the oxidation efficiency brought about by photo-synergic catalysis, which is also an important direction for development of the electro-Fenton technology. In a typical UVA-PEF system, UVA ($\lambda$=315-400 nm) can catalyze all iron(III) complexes. However, when UVA is used for performing this reaction, the non-selectivity of photolysis leads to high operating costs, limiting practical engineering application of photoelectro-Fenton oxidation.

Therefore, how to minimize external additions, break the bottleneck of degradation of refractory intermediates such as iron(III)-carboxylate complexes produced in a Fenton process, and minimize the amount of iron sludge produced or recycle a ferrous catalyst in a cost-effective manner has become an urgent problem to be resolved.

SUMMARY

1. Problem to be Resolved

In view of the problem that external aeration or external addition of H$_2$O$_2$ is required during electrocatalytic Fenton oxidation treatment of sewage in the prior art, the present invention provides an electrocatalytic Fenton oxidation-electrochemical oxidation coupling process and apparatus for efficient treatment of chemical wastewater. In the apparatus, an electrocatalytic Fenton oxidation step is performed in a narrow channel, so that oxygen produced by an anode oxygen evolution reaction is in contact with a cathode to produce $H_2O_2$ for the Fenton reaction to proceed, and treatment requirements can be met without external aeration or external addition of $H_2O_2$.

Further, in view of the problem that iron complexes produced in the electrocatalytic Fenton oxidation process are difficult to degrade, the present invention provides a narrow-channel electrochemical oxidation step coupled with the narrow-channel electrocatalytic Fenton oxidation in use. The iron complexes produced in the electrocatalytic Fenton oxidation process are directly reduced at the cathode after the decomplexation at the anode in the narrow-channel electrochemical oxidation stage to ensure the concentration of ferrous ions in the system. Moreover, low-molecular organic acids and other easily complexed organics are released to be degraded by the previous electrocatalytic Fenton oxidation step, thereby further improving the efficiency of electro-Fenton oxidation in COD removal.

Further, in view of the technical problem that the iron sludge formed by iron ions produced after Fenton oxidation cannot be recycled, by connecting a pH adjusting tank with an electrocatalytic Fenton oxidation-electrochemical oxidation coupling apparatus in series, the iron sludge is dissolved into iron ions to return to the electrochemical oxidation step and to be reduced to ferrous ions, thereby realizing a coupling treatment process with near-zero production of iron sludge.

2. Technical Solution

In order to resolve the above problems, the technical solutions adopted by the present invention are as follows:

An electrocatalytic Fenton oxidation-electrochemical oxidation coupling process for efficient treatment of chemical wastewater includes an electrocatalytic Fenton oxidation step, an electrochemical oxidation step and a pH adjustment step, where a spacing between an anode and a cathode in the electrocatalytic Fenton oxidation step is controlled so that oxygen produced at the anode reacts at the cathode to produce $H_2O_2$.

The reactions that occur in the electrocatalytic Fenton oxidation step include: iron loses electrons at the anode to produce ferrous ions, and oxygen evolution reaction occurs at the anode to produce oxygen; oxygen produced at the anode approaches the cathode in a narrow channel and reacts to produce $H_2O_2$; and under the narrow channel condition, the ferrous ions produced at the anode and the $H_2O_2$ produced at the cathode undergo Fenton oxidation reaction to degrade organics.

The reactions that occur in the electrochemical oxidation step include: the target pollutants are mainly oxidized by the anode at the beginning of the reaction, and the iron (III) complexed with low-molecular organic acid is more stable and the cathode is reduced to the complex state iron (II) and continues to participate Fenton reaction. In the late stage of the reaction, complexes formed by iron and the degradation intermediate of organic acid organics undergo decomplexation at the anode; and the iron ions after decomplexation are reduced to ferrous ions at the cathode.

The pH adjustment step includes the step of dissolving the iron sludge produced by the Fenton oxidation reaction.

Preferably, in the electrocatalytic Fenton oxidation step, the mass concentration of $H_2O_2$ produced by reaction at the cathode of oxygen produced at the anode is generally 100-5,000 mg/L, where the concentration of the produced $H_2O_2$ varies with the current density and the anode-cathode spacing.

Preferably, the coupling process may be used as a pre-treatment section of high-concentration chemical wastewater, where the COD concentration does not exceed 80,000 mg/L, and the COD removal rate may reach 50-65% when the coupling process is used for pretreatment.

More preferably, the coupling process may be used for advanced treatment of chemical tail water, where the COD concentration of the chemical tail water does not exceed 500 mg/L. When the COD does not exceed 500 mg/L, the COD removal rate of advanced treatment using the above-mentioned coupling process may reach 60-85%. It can be seen that the coupling process is more suitable for the advanced treatment of chemical tail water.

Preferably, in the electrocatalytic Fenton oxidation step, a narrow-channel electrocatalytic Fenton oxidation step with a spacing between the cathode and the anode less than or equal to 5 cm, preferably 1-5 cm, is adopted; and/or in the electrochemical oxidation step, a narrow-channel electrochemical oxidation step with a spacing between the cathode and the anode less than or equal to 5 cm, preferably 0.5-5 cm, is adopted.

Because of the narrow channel in the narrow-channel electrochemical oxidation step and the turbulence effect generated by the circulation of water, the iron(III) formed after decomplexation at the anode is more likely to collide with the cathode surface. The iron(III) can be reduced to iron(II) after being in contact with the cathode. The converted iron(II) can enter the electrocatalytic Fenton oxidation step with the water flow and be used as a catalyst to react with $H_2O_2$ to generate a strong oxidant ·OH to attack the remaining organics. The carboxylate after decomplexation can be further degraded on the anode surface of an electrochemical oxidation tubular reactor through direct oxidation (the anode surface gains electrons to directly degrade organics) or indirect oxidation (·OH is generated on the anode surface and organics are degraded by the ·OH), and can also enter the electrocatalytic Fenton oxidation reaction system with water flow to be further oxidized by ·OH. Preferably, the spacing between the cathode and the anode in the electrocatalytic Fenton oxidation step is less than or equal to 3 cm; and/or the spacing between the cathode and the anode in the electrochemical oxidation step is less than or equal to 3 cm.

Preferably, the spacing between the cathode and the anode in the electrocatalytic Fenton oxidation step is 1-3 cm, and/or the spacing between the cathode and the anode in the electrochemical oxidation step is 0.5-3 cm. Because the anode-cathode spacing (1-3 cm) in the electrocatalytic Fenton oxidation step is small and a liquid turbulence phenomenon is obvious, $O_2$ produced by the oxygen evolution reaction of the anode in the narrow-channel electrocatalytic Fenton oxidation step is transferred to the cathode surface. The following reaction (1) occurs at the cathode, and the following reaction (2) occurs between the hydrogen peroxide produced at the cathode and the $Fe^{2+}$ produced at the anode in the narrow channel. The produced hydroxyl radicals ·OH attack NHCs and OHCs, and open the ring structure of heteroaromatic compounds to produce intermediate products, such as low-molecular organic carboxylic acids with a chain structure. The low-molecular organic carboxylic acids can form iron(III)-carboxylate complexes with $Fe^{3+}$. However, a Fenton reaction is limited due to strong stability of the complexes.

$$O_2+2e^-+2H^+ \rightarrow H_2O_2 \qquad (1)$$

$$Fe^{2+}+H_2O_2 \rightarrow Fe^{3+}+\cdot OH+OH^- \qquad (2)$$

Preferably, the coupling process adopts cyclic treatment in a sequence of a narrow-channel electrocatalytic Fenton oxidation step, a narrow-channel electrochemical oxidation step and a pH adjustment step, or cyclic treatment in a sequence of a narrow-channel electrocatalytic Fenton oxidation step, a pH adjustment step and a narrow-channel electrochemical oxidation step.

Preferably, an electrode in the electrocatalytic Fenton oxidation step is a plate electrode or a tubular electrode; anode and cathode materials are as follows respectively:

Anode: a composite microporous iron electrode formed by pressing, roasting and molding of iron powder, where since the composite iron electrode has a low oxygen evolution potential, the composite iron electrode is likely to undergo an oxygen evolution reaction.

Cathode: a modified carbon material or stainless steel electrode.

Preferably, the modified carbon material is modified graphite, and the base material is graphite felt with a thickness of 2-5 mm.

Preferably, the anode of the electrocatalytic Fenton oxidation step is prepared from pig iron powder (45%) and wrought iron powder (55%) by mixing, rolling and grinding to a mesh size of 80-160 mesh. The mixture is placed in a tubular template or a flat template, and sintered at 350° C. for 1-3 h after pressing. The composite iron electrode prepared by the method is relatively economical in cost, and the utilization rate of iron is high.

Preferably, the modification step of the cathode carbon material of the electrocatalytic Fenton oxidation step includes the following steps:

selecting a carbon material such as graphite felt or carbon felt, and washing the carbon material with acetone, ethanol and ultrapure water to remove surface grease;

preparing a catalyst: adding 1.0-2.0 g of carbon black and 0.1-0.5 g of polytetrafluoroethylene emulsion (60%) to ethanol, and performing ultrasonic treatment for 20-60 min for uniform dispersion;

preparing a carbon black-polytetrafluoroethylene electrode: putting the treated graphite felt (or carbon felt) into the catalyst solution, performing ultrasonic treatment to make the carbon black-polytetrafluoroethylene agglomerates evenly adhere to the carbon fiber surface of the graphite felt (or carbon felt); putting the graphite felt (or carbon felt) in a vacuum oven for vacuum drying at 75-105° C. for 20-30 h; finally putting the dried electrode in a muffle furnace for sintering (320-370° C., 1-1.5 h); and repeating the above steps 2-3 times to realize uniform adhesion of the catalytic layer on the electrode surface; and if a tubular electrode needs to be prepared, rolling the treated modified carbon material into a tube by using a rolling press.

Preferably, in the electrocatalytic Fenton oxidation step, the current density and the anode-cathode spacing are adjusted, the concentration of $H_2O_2$ is monitored in real time to make a mass concentration ratio of $\Delta COD$ to $H_2O_2$ 1:(0.5-1), and a molar ratio of iron(II) to $H_2O_2$ 1:(8-12). When the concentration of iron(II) and $H_2O_2$ produced reaches a set value, a power supply of the electrocatalytic Fenton oxidation step is turned off and no electricity is supplied. Since the concentration of iron(II) is related to the current density, and the concentration of $H_2O_2$ is related to the current density and the anode-cathode spacing, during the experiment, the current density is firstly adjusted to a specific concentration range of iron(II), and then the spacing is adjusted to make the concentration of $H_2O_2$ reach the desired value.

Preferably, it is found through many experiments that when the current density is controlled to be 8-15 $mA/cm^2$ and the anode-cathode spacing is controlled to be 1-3 cm in the electrocatalytic Fenton oxidation step, the iron ion concentration and the hydrogen peroxide concentration can meet the required ranges simultaneously. The measured hydrogen peroxide concentration under the above conditions is close to the theoretical value and meets the conditions.

The amount of iron(II) and $H_2O_2$ required in the solution is significantly decreased compared with that of traditional Fenton oxidation. When the above cathode and anode are electrified, the surface of the composite microporous iron electrode loses electrons due to anodization. Iron(II) is dissolved in water through anodizing and is not added in a powder form. The iron(II) has high activity and a fast diffusion rate. The required iron(II) concentration is calculated by the amount of electrons lost in the electrification process on the anode, and the required current magnitude and electrification time are obtained. (M=KQ=KIt, k=M/Fn, where M—the mass of the precipitated metal; K—the proportional constant (electrochemical equivalent); Q—the quantity of electricity passed; I—the current intensity; t—the electrification time, n refers to the absolute value of the total number of positive or negative valences in the compound; F is the Faraday constant, the value is F=9.65×10,000 C/mol, which is the product of the Avogadro number $N_A=6.02214 \cdot 10^{23}$ $mol^{-1}$ and the element charge $e=1.602176 \cdot 10^{-19}$ C, also known as the Faraday constant).

The concentration of hydrogen peroxide is obtained through real-time measurement, and the measurement method is as follows:

The $H_2O_2$ output experiment of all electrodes is to measure the $H_2O_2$ concentration in 250 mL of 50 mM sodium sulfate electrolytic solution at different times. The concentration of $H_2O_2$ can be measured at 400 nm by a German WTW brand UV-Visible spectrophotometer, with potassium titanium oxalate as a developer.

Preferably, the electrodes in the electrochemical oxidation step are tubular and are assembled in a parallel nesting manner; anode and cathode materials are as follows respectively:

Anode: an electrode with an oxygen evolution potential greater than 1.5 V, which may be a titanium-based lead dioxide electrode, an iridium tantalum electrode, a ruthenium dioxide electrode, a tin antimony coated electrode, etc., or a BDD electrode, a platinum electrode, etc.

Cathode: a stainless steel or titanium-based or modified carbon material (for the specific preparation method, please refer to the preparation method of the modified carbon material of the cathode in the above electrocatalytic Fenton oxidation step).

Preferably, the anode in the electrochemical oxidation step is a titanium-based lead dioxide coated tubular electrode, and the preparation steps include the following steps: filling a reaction tank with a 10-30% oxalic acid solution and heating the oxalic acid solution to 80-100° C.; turning on a pump so that the oxalic acid flows in the middle layer of the anode and cathode to remove oil stains from the surfaces of the titanium base and stainless steel, and etch the titanium base surface into a gray pitted titanium base surface; pretreating the surface of the tubular titanium base film by cleaning and acid etching, and continuing the process for 1-3 h; after pretreatment, filling the reaction tank with an appropriate amount of deionized water (or distilled water) to clean the residual oxalic acid off the reactor, and repeating the process 1-3 times;

preparing an electrodeposition solution: weighing and dissolving an appropriate amount of lead nitrate in water, and stirring for dissolving at a constant temperature of 60-80° C. to prepare a 0.08-0.15 mol/L lead nitrate solution; weighing and dissolving an appropriate amount of sodium fluoride (or potassium fluoride) in the previously prepared lead nitrate solution, and stirring for dissolving at a constant temperature of 70-90° C. to prepare a 0.02-0.05 mol/L sodium fluoride (or potassium fluoride) solution; preparing a 0.5-1.5 mol/L nitric acid solution, and adding a certain amount of nitric acid solution dropwise to the prepared mixed solution of lead nitrate and sodium fluoride (or potassium fluoride) to make the pH value of the solution reach 2-3;

filling the reaction tank with an appropriate amount of the above-mentioned electrodeposition solution, stirring with a stirrer and heating to 40-80° C.; after turning on the pump, adjusting the flow rate of a peristaltic pump to 80-150 mL/min; when the reactor is filled with the electrodeposition solution and the electrodeposition solution begins to circulate, turning on a power switch and controlling the current density to 10-20 mA/cm$^2$; electrodepositing for 1-2 h to prepare an α-lead dioxide electrode intermediate layer; then, adjusting the current density to 40-90 mA/cm$^2$, and electrodepositing for 1-2 h to obtain a dark brown surface layer of a (3-lead dioxide electrode; and after electrodeposition, filling the reaction tank with distilled water, turning on the peristaltic pump, and cleaning the reactor 2-3 times, and then putting the reactor into actual operation; and neutralizing the electrodeposition solution after the reaction with alkali and treating the solution as a waste solution.

Preferably, as shown in FIGS. 1 and 2, both the anode and the cathode in the electrochemical oxidation (i.e. electrocatalytic oxidation) step can be used as outer tubes. When the anode is used as the outer tube, the anode coating is on the inner wall of the anode; and when the cathode is used as the outer tube, the anode coating is on the outer wall of the anode.

More preferably, when the cathode is used as the outer tube, the upper and lower parts of the cathode outer tube are provided with water inlet and outlet pipes, and wastewater flows in an enclosed space in the cavity between the cathode and the anode.

Preferably, the current density in the electrochemical oxidation is 1-20 mA/cm$^2$. It is found by research that when the current density when electrified is 1-20 mA/cm$^2$, an iron(III)-carboxylate complex enters the cavity of an electrochemical oxidation tubular reactor with wastewater. The iron(III)-carboxylate complex can undergo a decomplexation reaction at the anode, the chemical bond between iron(III) and carboxylate is broken, and the iron(III) and the carboxylate are separated and diffuse into the water. With the increase of the current density, the decomplexation effect is more obvious and the iron(III) concentration rises faster.

Further preferably, the current density in the electrochemical oxidation is 1-4 mA/cm$^2$, or 5-12 mA/cm$^2$, or 13-20 mA/cm$^2$, and the anode-cathode spacing is controlled to be 0.5-3 cm simultaneously.

Preferably, the pH value of the pH adjustment step is 2-4. In addition to iron(III)-carboxylate complexes, Fe(OH)$_3$ precipitate is also an important existence form of iron(III) after Fenton oxidation. Since the solubility product ($K_{sp}$) of iron hydroxide Fe(OH)$_3$ is $1.1 \times 10^{-36}$ (18° C.), assuming that the concentration of Fe$^{3+}$ is 0.1 mol/L, precipitate can begin to form when the pH is 1.9. The initial pH of the electrocatalytic Fenton oxidation is generally controlled in the range of 3-5, so Fe(OH)$_3$ precipitate exists in the reaction system. The aforementioned iron(III)-carboxylate complexes and Fe(OH)$_3$ precipitate will affect the continuation of the Fenton reaction and the further conversion and utilization of Fe$^{3+}$, leading to stagnant removal of COD and pollutants. In view of the problem, a pH adjusting tank is added at the end of the narrow-channel electrocatalytic Fenton oxidation and narrow-channel electrochemical oxidation to adjust the pH value to 2-4. After the Fe(OH)$_3$ precipitate enters the tank, an acid-base neutralization reaction occurs to dissolve the formed Fe(OH)$_3$ precipitate. Iron(III) ions return to the water again, enter the cathode and anode synergistic coupling system of the electrochemical oxidation, are reduced to iron(II) ions at the cathode, and recycled to participate in the previous electrocatalytic Fenton oxidation reaction.

Thus, the three stages are carried out in cycles, and the iron(II) that diffuses into the water through anodizing in the electrocatalytic Fenton oxidation step can be utilized to the greatest extent. Although the electrocatalytic Fenton oxidation step will form iron(III)-carboxylate complexes and Fe(OH)$_3$ precipitate, the iron(III)-carboxylate complexes can undergo decomplexation in the anode and cathode synergistic coupling system of the electrochemical oxidation step, and the Fe(OH)$_3$ precipitate can be dissolved in the pH adjustment step. The iron(III) returned to the water after the two steps of electrocatalytic Fenton oxidation and pH adjustment can be reduced and converted into iron(II) at the cathode in the electrochemical oxidation step. The process not only can achieve near-zero discharge of iron sludge and reuse of iron, but also can increase the removal rate of COD, NHCs and OHCs from wastewater.

An electrocatalytic Fenton oxidation-electrochemical oxidation coupling apparatus for efficient treatment of chemical wastewater includes a circulating treatment apparatus formed by an electrocatalytic Fenton oxidation unit with a narrow channel, an electrochemical oxidation unit and a pH adjustment unit connected in sequence, or includes a circulating treatment apparatus formed by an electrocatalytic Fenton oxidation unit with a narrow channel, a pH adjustment unit and an electrochemical oxidation unit connected in sequence.

Preferably, the electrocatalytic Fenton oxidation unit is a plate electrode or a tubular electrode, and/or the electrochemical oxidation unit is a tubular electrode.

Preferably, the anode-cathode spacing in the electrocatalytic Fenton oxidation unit (i.e. the channel width) is 1-3 cm, and/or the anode-cathode spacing in the electrochemical oxidation step (i.e. the channel width) is 0.5-3 cm.

3. Beneficial Effects

Compared with the prior art, the present invention has the following beneficial effects:

(1) The technical solution of the present invention adopts an electrocatalytic Fenton oxidation step with a narrow channel for pretreatment of chemical wastewater or advanced treatment of chemical tail water. Oxygen is produced by an oxygen evolution reaction at an anode. Due to the narrow anode-cathode spacing, the oxygen produced by the anode is more likely to be in contact with the cathode, and produces $H_2O_2$ at the cathode. The amount of the $H_2O_2$ can meet the need of the Fenton oxidation reaction to treat COD without external aeration or external addition of hydrogen peroxide (without external aeration or without addition of $H_2O_2$, chemical wastewater with COD below 80,000 mg/L can be treated). Preferably, for the tail water of chemical industry, the COD is low (generally less than 500 mg/L) so that the required $H_2O_2$ concentration is low (less than 500 mg/L), and the COD removal efficiency is higher.

(2) In the present invention, a narrow channel is also arranged in the electrochemical oxidation step for decomplexation of iron complexes at the anode. In addition, the iron ions after decomplexation are directly reduced to ferrous ions at the cathode through the narrow channel, ensuring the concentration of ferrous ions in the system, and further improving the efficiency of advanced removal of COD by electrocatalytic Fenton oxidation.

(3) In the present invention, in view of the iron sludge formed by iron ions produced after Fenton oxidation, by connecting a pH adjusting tank with an electrocatalytic Fenton oxidation-electrochemical oxidation coupling apparatus in series, the iron sludge is dissolved into iron ions to return to the electrochemical oxidation step and to be reduced to ferrous ions, thereby realizing a coupling advanced treatment process with near-zero production of iron sludge. The three steps are performed cyclically to achieve the objective of meeting the COD treatment requirements without external aeration or external addition of $H_2O_2$.

DETAILED DESCRIPTION

Figure 1:
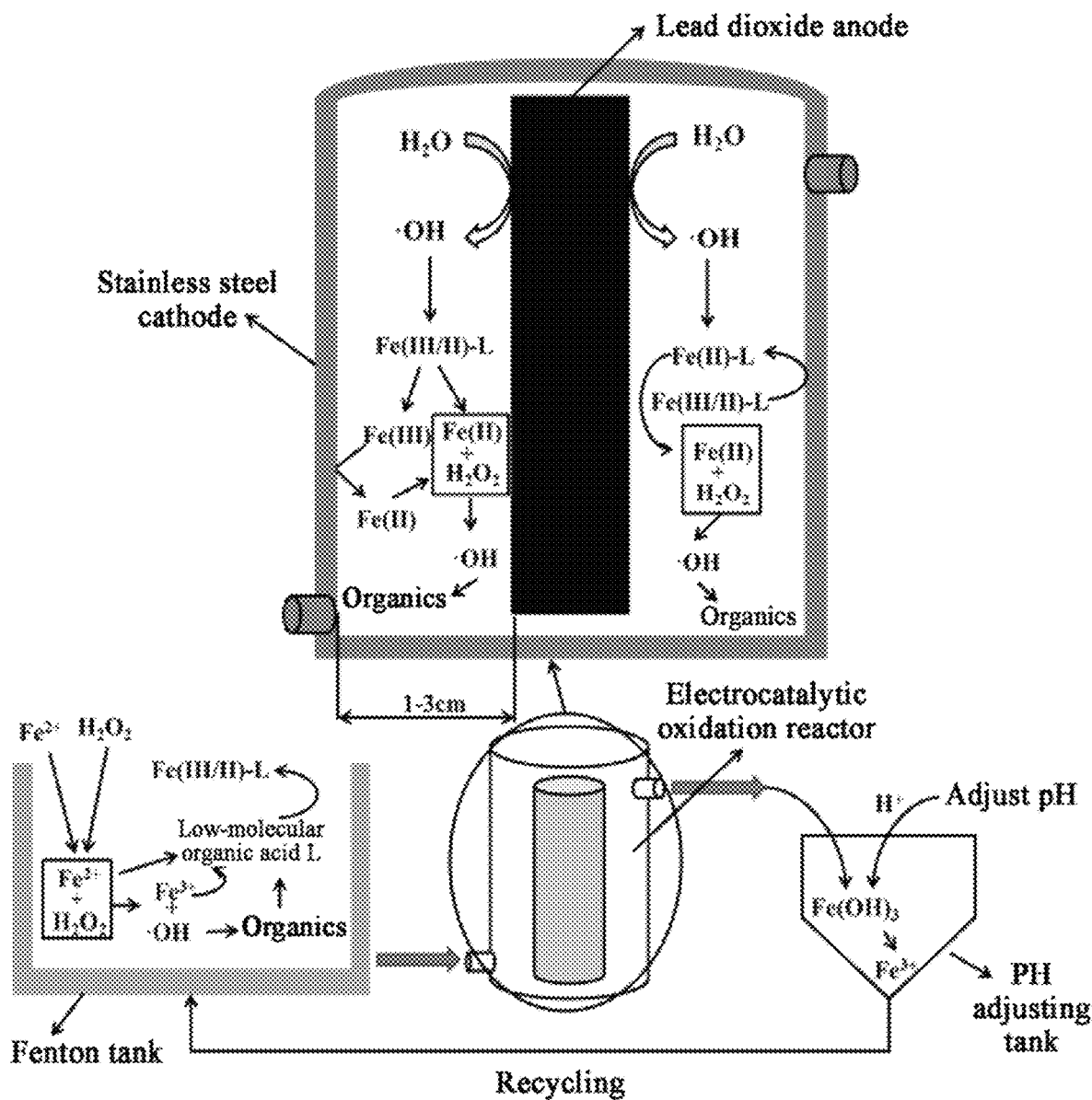
FIG. 1 is a flow and mechanism diagram of an electrocatalytic Fenton oxidation-electrochemical oxidation coupling process.
Figure 2:
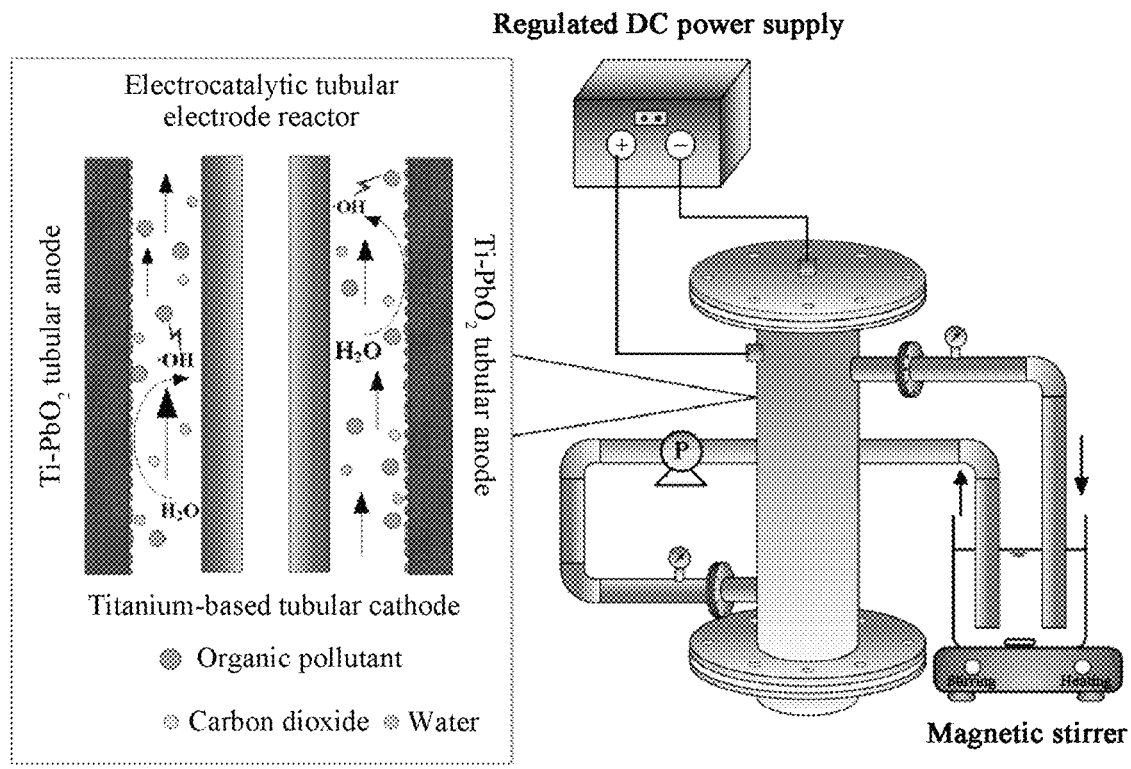
FIG. 2 is a structure diagram of a cathode-anode synergetic system of narrow-channel electrochemical oxidation (i.e., electrocatalytic oxidation).

It should be noted that, unless otherwise defined, all technical and scientific terms used herein have the same meaning as commonly understood by those skilled in the technical field of the present invention. The term "and/or" as used herein includes any and all combinations of one or more related listed items.

If specific conditions are not indicated in the embodiments, it shall be carried out in accordance with the conventional conditions or the conditions recommended by the manufacturer. The reagents or instruments used without any indication of the manufacturer or given preparation method are all conventional products that can be purchased commercially.

Spacing, concentration, amount, and other numerical data can be presented in a range format herein. It should be understood that such a range format is used only for convenience and brevity, and should be flexibly interpreted as including not only the values explicitly stated as the limits of the range, but also all individual values or subranges covered within the range, as if each value and subrange are explicitly stated. For example, a numerical range of about 1 to about 3 should be interpreted as not only including the explicitly stated limit values of 1 to about 3, but also including individual numbers (such as 2, 2.5) and subranges (such as 1 to 2.5, 2 to 2.8). The same principle applies to a range that only states one value, for example "less than or equal to about 3" should be interpreted as including all the above-mentioned values and ranges. In addition, the interpretation should apply regardless of the range or the breadth of features described.

As used herein, the term "about" is used to provide flexibility and imprecision related to a given term, metric, or value. Those skilled in the art can determine the degree of flexibility of specific variables in combination with the context.

The scope of the present invention should be determined only by the appended claims and their legal equivalents, rather than by the description and examples given in this specification.

Unless otherwise specified, the "electrocatalytic Fenton oxidation-electrochemical oxidation" coupling process referred to in the present invention is a sequential "electrocatalytic Fenton oxidation-electrochemical oxidation-pH adjustment" or "electrocatalytic Fenton oxidation-pH adjustment-electrochemical oxidation" coupling process, that is, including two processes connected in series in different sequences. However, if there are special descriptions, the meaning should be determined based on the corresponding descriptions and context.

The present invention will be further described below with reference to specific embodiments.

Embodiment 1

In the present embodiment, the industrial tail water to be treated is the discharged tail water of a pesticide manufacturer after biochemical treatment, the COD content of the industrial tail water is 200-300 mg/L, and the main pollutants are flutriafol, tebuconazole, cyclic azole, bensulfuron methyl and other nitrogenous heteroaromatic organics.

The flow and mechanism diagram of a "narrow-channel electrocatalytic Fenton oxidation, narrow-channel electrochemical oxidation and pH adjustment" coupling process for advanced treatment of chemical tail water is similar to that shown in FIG. 1 (where the electrocatalytic Fenton oxidation is carried out using a tubular electrode in FIG. 1, and using a plate electrode in the present embodiment, and the electrochemical oxidation cathode adopts a modified graphite porous electrode in the present embodiment), including a circulating treatment apparatus formed by a narrow-channel electrocatalytic Fenton oxidation unit, a narrow-channel electrochemical oxidation unit and a pH adjustment unit connected in sequence. During treatment, the flow rate of wastewater is controlled to be 35-50 $m^3$/h, and the treatment capacity per unit time is 100 $m^3$/d.

In the present embodiment, the electrocatalytic Fenton oxidation unit is a plate electrode, the anode adopts a 100 mesh composite iron electrode (see the technical solution section for the preparation method), the cathode adopts a modified carbon black-polytetrafluoroethylene graphite felt electrode (see the technical solution section for the preparation method), and the anode-cathode spacing is 3 cm. In the stage, by adjusting the current density, $H_2O_2$ and iron(II) produced are controlled as: the mass concentration ratio of ΔCOD (that is, the concentration of COD to be removed, which is a difference obtained by subtracting the COD of the after-treated effluent from the COD of the influent of chemical wastewater) to the $H_2O_2$ is about 1:0.75, and the molar ratio of the iron(II) to the $H_2O_2$ is about 1:8, which are calculated by the method in the technical solution section according to the concentration of iron(II) required. The current density is controlled to be 8.5-10 mA/$cm^2$ when electrified (it is found through experiments that controlling the current density within the range can basically keep the concentration of the iron(II) and $H_2O_2$ at the above-mentioned ratio). When the concentration of iron(II) and $H_2O_2$ produced reaches the set value, the power supply of the electrocatalytic Fenton oxidation step is turned off.

The narrow-channel electrochemical oxidation unit is a tubular electrode, the anode adopts a titanium-based lead dioxide tubular electrode (see the technical solution section for the preparation method), the cathode adopts a modified tubular graphite porous (pore diameter 1-5 μm) electrode (see the technical solution section for the preparation method, the raw material is graphite with a pore diameter of 1-5 μm), and the anode-cathode spacing is 1 cm. The current density is controlled to be about 10 mA/$cm^2$ when electrified. It should be noted that in an experiment where the cathode was a stainless steel or titanium base in the electrochemical oxidation step, the objective of the present invention can also be achieved.

The pH adjustment unit controls the pH to 2-4.

Figure 3:
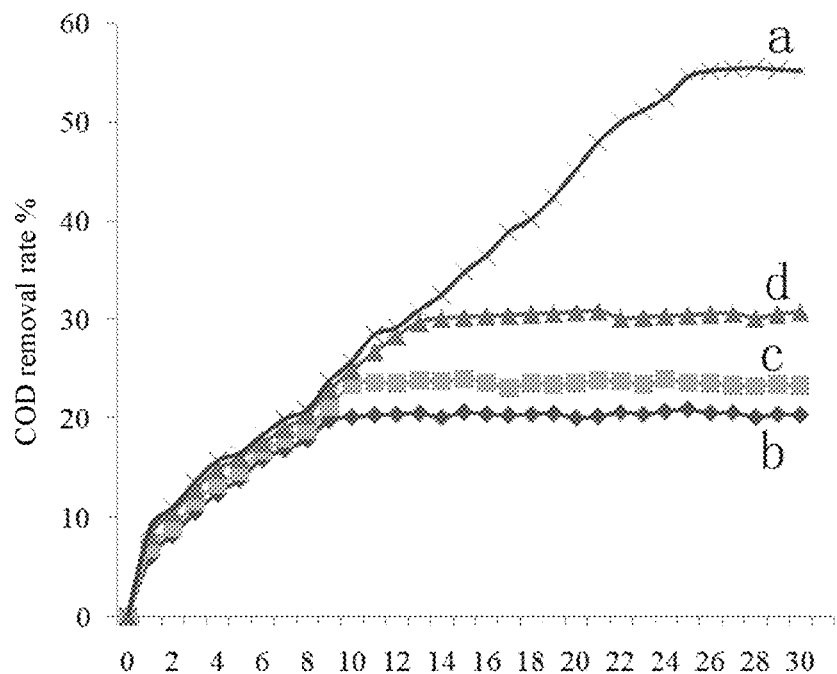
FIG. 3 is a diagram showing the changes of the COD removal rates of wastewater containing the same initial COD respectively treated by the electrocatalytic Fenton oxidation-electrochemical oxidation coupling process, traditional Fenton oxidation, electrochemical oxidation, and electrocatalytic Fenton oxidation.

After 30 h of circulating treatment, the variation in the COD removal rate of wastewater is as shown in FIG. 3(*a*). The results show that in the first 24 h, the COD removal rate in the system continuously increases. In the process, an electrocatalytic Fenton oxidation reaction occurs, and causes ring-opening and degradation of nitrogenous heteroaromatic organics into intermediate products such as low-molecular carboxylic acid organics. The produced ferric ions are also complexed with the low-molecular carboxylic acid organics, enter the narrow-channel electrochemical oxidation system, and undergo anode decomplexation and cathode reduction reactions. Therefore, the ferrous ions can be reused to degrade the low-molecular carboxylic acid and other intermediate products, so that the COD removal rate is continuously increasing. After 24 h, the $H_2O_2$ produced in the electrocatalytic Fenton oxidation section has basically reacted with the ferrous ions, and the COD removal rate in the system is nearly constant, at 55-65%.

Under the same conditions as the present embodiment, traditional Fenton oxidation, individual electrochemical oxidation, and individual electrocatalytic Fenton oxidation are adopted respectively to treat wastewater containing the same initial COD, and the COD removal rate is compared with that of Embodiment 1.

Comparative Example 1A

The present comparative example adopts the traditional Fenton oxidation method (including only a Fenton oxidation step, and no electrochemical oxidation and pH adjustment steps). The treated wastewater is the same as in Embodiment 1, the amount of $H_2O_2$ and iron(II) added is the same as in Embodiment 1, that is, the mass concentration ratio of ΔCOD to $H_2O_2$ is 1:0.75, the molar ratio of iron(II) to $H_2O_2$ is 1:8 (the addition form of iron(II) is ferrous sulfate powder), and the reaction time is 30 h. The COD removal rate is as shown in FIG. 3(*b*).

Comparative Example 1B

The present comparative example adopts an electrochemical oxidation method (including only one step of electrochemical oxidation, and no electrocatalytic Fenton oxidation and pH adjustment steps). The treated wastewater is the same as in Embodiment 1. The electrode material, current density and other conditions are the same as those in Embodiment 1. The current density is 10 mA/$cm^2$, the anode-cathode spacing is 1 cm, the reaction time is 30 h, and other conditions of the electrochemical oxidation are the same as in Embodiment 1. The COD removal rate is as shown in FIG. 3(*c*).

Comparative Example 1C

The present comparative example adopts an electrocatalytic Fenton oxidation method (including only one step of electrocatalytic Fenton oxidation, and no electrochemical oxidation and pH adjustment steps). The treated wastewater is the same as in Embodiment 1, the electrode material used in the electrocatalytic Fenton oxidation is the same as in Embodiment 1, and the anode-cathode spacing is the same as in Embodiment 1, which is 3 cm. The current density is adjusted so that the mass ratio of ΔCOD to $H_2O_2$ is about 1:0.75, and the molar ratio of iron(II) to $H_2O_2$ is about 1:8. When the concentration of iron(II) and $H_2O_2$ produced reaches the above value, the power supply of the electrocatalytic Fenton oxidation step is turned off. The reaction time is 30 h, and other conditions of the electrocatalytic Fenton oxidation are the same as in Embodiment 1. The COD removal rate is as shown in FIG. 3(*d*).

TABLE 1

Comparison of 30 h COD removal rate between Embodiment 1 and Comparative Examples 1A to 1C

| Embodiment or Comparative Example | Embodiment 1 | Comparative Example 1A | Comparative Example 1B | Comparative Example 1C |
|---|---|---|---|---|
| 30 h COD removal rate % | 55-65% | 12-25% | 15-30% | 25-35% |

As shown in Table 1, Embodiment 1 is compared with Comparative Examples 1A to 1C, and the results show that: by individual traditional Fenton oxidation (Comparative Example 1A), after iron ions and the intermediate product form a complex, the further progress of the reaction is hindered, making degradation stagnant. The individual electrocatalytic Fenton oxidation has a certain enhancement on the basis of traditional Fenton oxidation. The reason is that the ferrous ions produced by the anode in the electrocatalytic Fenton oxidation are more active than the ferrous ions diffused into the water by adding the ferrous sulfate powder in traditional Fenton oxidation. The ferrous sulfate powder added in traditional Fenton oxidation diffuses into the water and easily agglomerates, affecting the use of ferrous ions. The electrocatalytic Fenton oxidation (Comparative Example 1C) circumvents the problem. Ferrous ions can be produced on the entire anode surface, the anode surface has many active sites, and the produced ferrous ions have good dispersion and high activity. Individual electrochemical oxidation (Comparative Example 1B) has the problem of non-selectivity. When nitrogenous heteroaromatic organics are degraded into intermediate products, the pollutant components in the water are more complicated, and the efficiency of electrochemical oxidation decreases. Over time, the voltage of electrochemical oxidation increases, and the side reaction of oxygen evolution becomes more serious, making the COD removal rate stabilize. The "electrocatalytic Fenton oxidation-electrochemical oxidation-pH adjustment" coupling process (Embodiment 1) overcomes the above problems and can achieve continuous and efficient removal of COD.

Embodiment 2

Other conditions and the object to be treated are the same as in Embodiment 1, and the difference is as follows:

The anode-cathode spacing of a narrow-channel electrocatalytic Fenton oxidation unit in the apparatus is 2 cm; and the anode-cathode spacing of a narrow-channel electrochemical oxidation tubular reactor unit is 1 cm.

The current density in narrow-channel electrocatalytic Fenton oxidation is adjusted to about 13.5-15 mA/cm$^2$, the mass ratio of ΔCOD to $H_2O_2$ is about 1:0.75, and the molar ratio of iron(II) to $H_2O_2$ is about 1:10; and when the concentration is reached, the power supply of the electrocatalytic Fenton oxidation step is turned off.

The current density of the narrow-channel electrochemical oxidation tubular reactor unit is about 15 mA/cm$^2$, and the reaction time is 24 h.

Compared with individual electrocatalytic Fenton oxidation directly connected with a pH adjustment unit in series, the reaction process of the "narrow-channel electrocatalytic Fenton oxidation, narrow-channel electrochemical oxidation and pH adjustment" coupling system can effectively assist and improve the degradation efficiency of Fenton oxidation for COD, NHCs and OHCs. The electrocatalytic Fenton oxidation reaction added into the additional electrochemical oxidation system can increase the removal rate of COD by 20-50%, and the removal rate of NHCs and OHCs by 50-80%.

The improvement of the above removal rate is divided into the following working conditions:

The current density of electrocatalytic Fenton oxidation is 15 mA/cm$^2$, the mass ratio of ΔCOD to $H_2O_2$ is about 1:0.75, the molar ratio of iron(II) to $H_2O_2$ is about 1:10, and the anode-cathode spacing is 2 cm. The current density of the narrow-channel electrochemical oxidation tubular reactor is 1-4 mA/cm$^2$, and the anode-cathode spacing is 1 cm. In comparison with the experiment where the electrochemical oxidation step is omitted, the removal rate of COD can be increased by 20-25%, and the removal rate of NHCs and OHCs can be increased by 50-60%.

Other conditions remain unchanged, and the current density of the narrow-channel electrochemical oxidation tubular reactor unit is 5-12 mA/cm$^2$. In comparison with the experiment where the electrochemical oxidation step is omitted, the removal rate of COD can be increased by 35-50%, and the removal rate of NHCs and OHCs can be increased by 70-80%.

Other conditions remain unchanged, and the current density of the narrow-channel electrochemical oxidation tubular reactor unit is 13-20 mA/cm$^2$. In comparison with the experiment where the electrochemical oxidation step is omitted, the removal rate of COD can be increased by 25-35%, and the removal rate of NHCs and OHCs can be increased by 60-70%.

Embodiment 3

Other conditions and the wastewater to be treated are the same as in Embodiment 1, and the difference is as follows:

The tubular electrode (closed space) of the narrow-channel electrochemical oxidation unit has an anode-cathode spacing of 3 cm, and the current density is about 20 mA/cm$^2$.

In order to explore the influence of a plate electrode and a tubular electrode on the narrow-channel electrochemical oxidation step, the applicant further conducted the experiment of Comparative Example 3 as a comparison.

Comparative Example 3

Other conditions and the wastewater to be treated are the same as in Embodiment 3. The difference is that the narrow-channel electrochemical oxidation unit is a plate electrode and has an open space, that is, the cathode and anode are inserted in a wastewater tank and electrified, the anode-cathode spacing is 3 cm, and the current density is about 20 mA/cm$^2$.

Figure 4A:
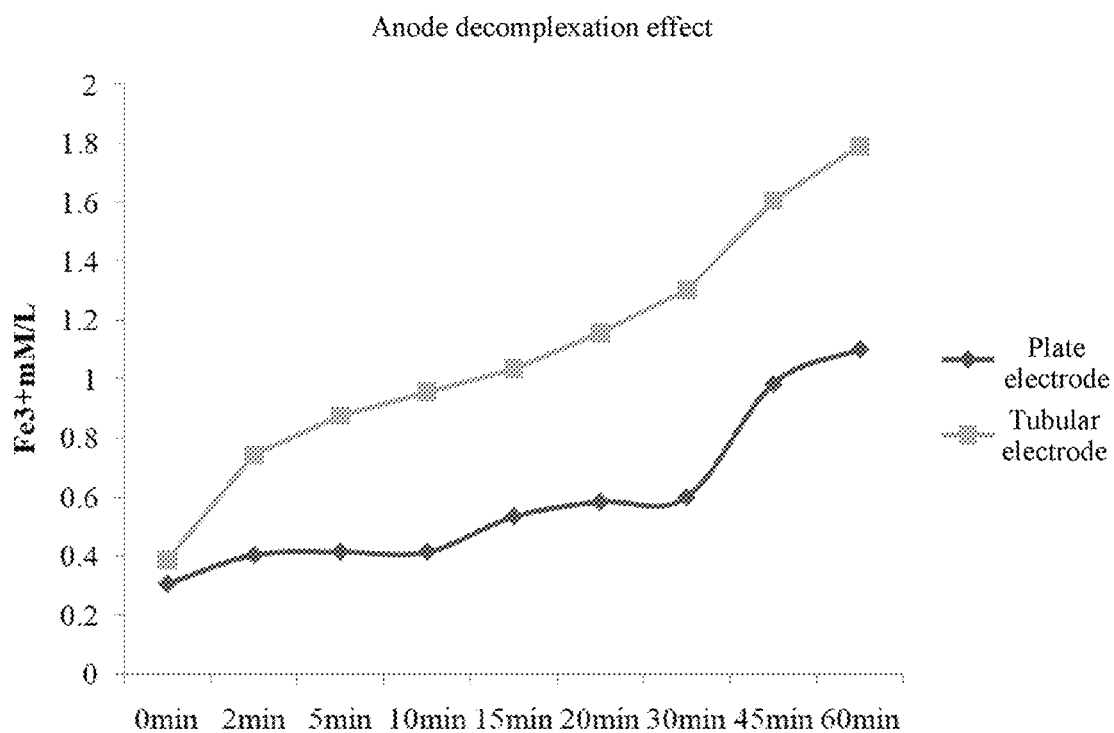
FIG. 4A is a diagram showing a comparison of the anode decomplexation effects of the narrow-channel electrochemical oxidation systems respectively using tubular and plate electrodes.

Embodiment 3 is compared with Comparative Example 3, and the results show that: as shown in FIG. 4A, there is a big difference in the decomplexation effect between the tubular electrode and the plate electrode both having a 3 cm anode-cathode spacing. Within 60 min of operation, the decomplexation effect of the anode of the tubular electrode is significantly higher than that of the plate electrode, and is about 20-30% higher. The reason is that the tubular electrode reactor is a closed space formed by nesting the cathode and the anode, and the anode-cathode spacing is small to form a narrow channel. The external pumping force of a pump allows wastewater to flow directionally in the cavity between the anode and the cathode, thereby increasing the probability of contact between pollutants and iron(III)-carboxylate complexes with the electrode surface, and breaking the bottleneck in diffusion control. In comparison with the open space of an ordinary plate electrode with a reaction process driven by no external force, the mass transfer efficiency and the removal efficiency of pollutants and COD are improved.

Figure 4B:
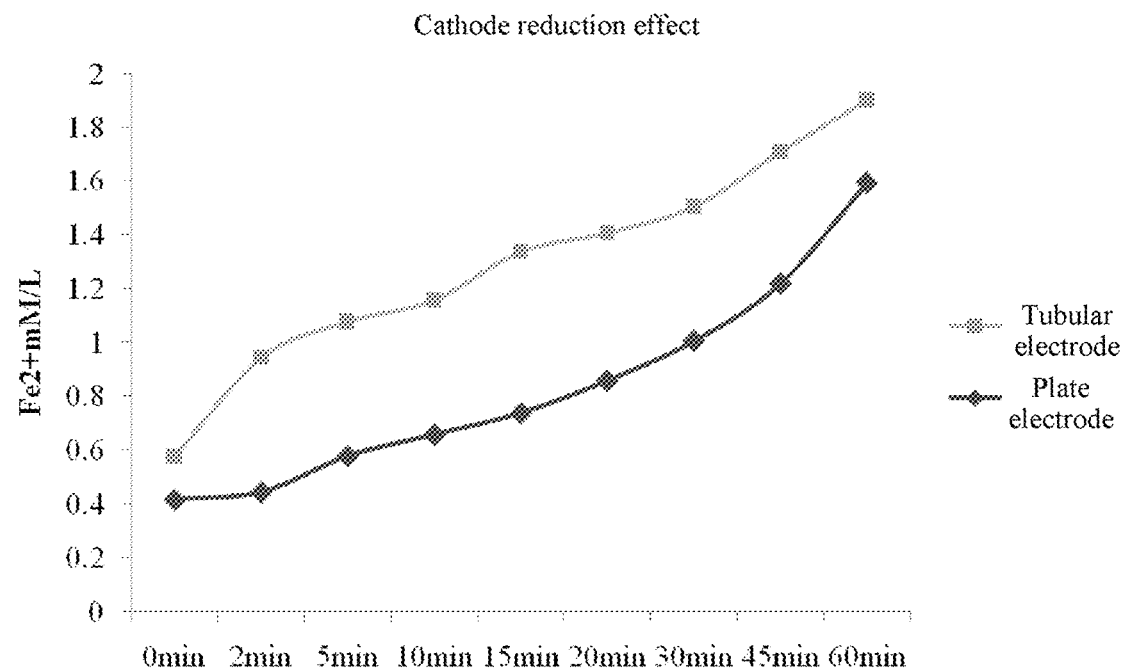
FIG. 4B is a diagram showing a comparison of the cathode reduction effects of the narrow-channel electrochemical oxidation systems respectively using tubular and plate electrodes.

As shown in FIG. 4B, there is a big difference in the cathode reduction effect between the tubular electrode and the plate electrode both having a 3 cm anode-cathode spacing. Within 60 min of operation, the cathode reduction effect of the tubular electrode is significantly higher than that of the plate electrode, and is about 15-25% higher. The reason is that after the above-mentioned anode decomplexation reaction, because the cathode and anode channel is narrow and is a closed pressurized space, the ferric ions after decomplexation will be in contact with the cathode surface with the water flow under the external force, and be reduced to ferrous ions to continue to participate in the electrocatalytic Fenton oxidation process. In an open-space plate electrode, not only the decomplexation efficiency is low, but the cathode reduction efficiency is also low.

Embodiment 4

For wastewater, with the raw water COD of 18,000 mg/L and a pH of 3.5, produced by a manufacturer of light stabilizers and tire anti-aging agents, the "narrow-channel electrocatalytic Fenton oxidation, narrow-channel electrochemical oxidation and pH adjustment" coupling process is adopted. The electrocatalytic Fenton oxidation unit is a tubular electrode, the anode is a composite iron electrode prepared using 80 mesh mixed iron powder (see the technical solution section for the preparation method), and the cathode is a tubular graphite electrode made of modified carbon black-polyvinylidene fluoride (see the technical solution section for the preparation method, the graphite pore size is 1-10 μm). The electrocatalytic Fenton oxidation unit adopts an anode-cathode spacing of 1 cm. The current density in the electrocatalytic Fenton oxidation step is adjusted so that the mass ratio of ΔCOD of the wastewater to be treated to $H_2O_2$ is about 1:0.55, the molar ratio of iron(II) to $H_2O_2$ is about 1:10, and the power supply of the electrocatalytic Fenton oxidation step can be turned off when the concentration is reached. The anode of the electrochemical oxidation unit is a titanium-based ruthenium dioxide tubular electrode (the preparation method refers to the preparation of the titanium-based lead dioxide coated electrode in the technical solution section), and the cathode is a stainless steel tubular electrode. The anode-cathode spacing of the tubular reactor used in the narrow-channel electrochemical oxidation stage is 1, 3, 10, and 30 cm respectively, and the current density is about 10 mA/cm²; the pH in the pH adjusting tank is controlled to be 3.5; the reaction time is 4 h; and samples are taken every 30 min. The monitoring results are shown in FIG. 5.

The concentration of hydrogen peroxide is measured in real time. The measuring method refers to: the $H_2O_2$ output experiment of all electrodes is to measure the concentration of $H_2O_2$ in 250 mL of 50 mM sodium sulfate electrolytic solution at different times. The concentration of $H_2O_2$ can be measured at 400 nm by a German WTW brand UV-Visible spectrophotometer, with potassium titanium oxalate as a developer.

Figure 5:
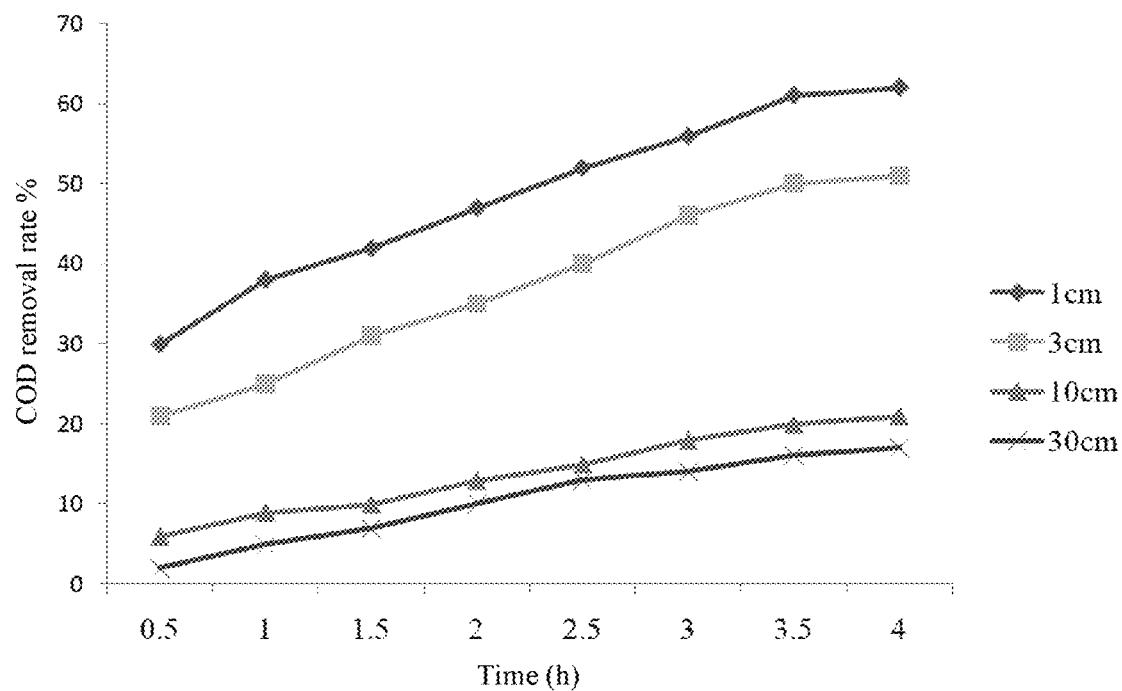
FIG. 5 is a diagram showing a comparison of the COD removal rates in the narrow-channel electrochemical oxidation step with different anode-cathode spacings within the same treatment time.

FIG. 5 is a diagram showing a comparison of the COD removal rates in the electrochemical oxidation step with different anode-cathode spacings within the same treatment time. According to the monitoring results, the anode-cathode spacing in the electrochemical oxidation step has a greater impact on the COD removal effect of the "narrow-channel electrocatalytic Fenton oxidation, narrow-channel electrochemical oxidation and pH adjustment" coupling process. When the anode-cathode spacing in the electrochemical oxidation step is 1 cm and 3 cm, the narrow-channel electrochemical oxidation system described in the present invention is conformed. It can be seen that over the reaction time, the removal rate of COD is much higher than the removal rate when the anode-cathode spacing in the electrochemical oxidation step is 10 cm and 30 cm under the same conditions. For example, in 4 h, the removal rate of COD when the anode-cathode spacing in the electrochemical oxidation step is 1 cm and 3 cm is higher than 50%, and when the anode-cathode spacing in the electrochemical oxidation step is increased to 10 cm and 30 cm, the removal rate of COD in 4 h is about 20%. This is because in the narrow-channel system, the anode of a tubular reactor can cause an iron(III)-carboxylate complex to undergo a decomplexation reaction. The iron(III) ions after the reaction are easily reduced by collision with the cathode surface due to the narrow spacing between the anode and the cathode, and are converted into iron(II) ions, so that the Fenton oxidation reaction at the front end can proceed. When the anode-anode spacing in the electrochemical oxidation step is increased to 10 cm and 30 cm, the probability of collision between the iron(III)-carboxylate complex and the anode is greatly reduced. Even after the decomplexation reaction occurs on the anode surface, the probability that the iron(III) ions can be in contact with the cathode surface greatly decreases, and the iron(II) ions cannot be reduced. As a result, the catalyst iron(II) ions required for the front-end Fenton oxidation cannot be continuously supplied, the Fenton oxidation reaction is stagnated, and the COD removal rate will remain at a low level for a long time.

Embodiment 5

Assuming that the same 5,000 mg/L COD is removed and the current density used for electrochemical oxidation is 10 mA/cm², through calculation, the direct relationship between the anode-cathode spacing of the electrochemical oxidation step and the operating cost is as shown in Table 2.

TABLE 2

Operating cost accounting table (Assuming that the same 5,000 mg/L COD is removed, and the current density used for electrochemical oxidation is 10 mA/cm²)

| Anode-cathode spacing in electrochemical oxidation (cm) | Operating voltage (V) | Operating current (A) | Treatment time (h) | Electricity price (RMB) | Operating costs (yuan (RMB)/ton of water) |
|---|---|---|---|---|---|
| 1 | 1.8 | 2.5 | 2 | 0.7 yuan/ Kw · h | 2.2995 |
| 3 | 2.8 | 3.4 | 2.5 | | 6.0955 |
| 10 | 8 | 2.6 | 6 | | 31.901 |
| 30 | 11.5 | 2.1 | 10 | | 61.685 |

Assuming for removing the same concentration of COD, the "electrocatalytic Fenton oxidation, electrochemical oxidation and pH adjustment" coupling process is adopted, wherein in the electrocatalytic Fenton oxidation stage, the current density is controlled so that the mass ratio of COD to $H_2O_2$ is 1:0.75, the molar ratio of iron(II) to $H_2O_2$ is 1:12, and the anode-cathode spacing in the electrocatalytic Fenton oxidation step is 2.5 cm. The current density used in the narrow-channel electrochemical oxidation stage is 10 mA/cm², and the anode-cathode spacing of the tubular reactor is 1, 3, 10, and 30 cm respectively. Under the premise of removing the same concentration of COD (5,000 mg/L), the required removal time is 2, 2.5, 6 and 10 h respectively. The larger the distance, the lower the efficiency of treatment for the same concentration of COD, and the reason is explained in the previous content. Moreover, as the anode-cathode spacing in electrochemical oxidation increases, the working voltage increases immediately, and a substantial increase in power consumption is inevitably caused. Therefore, in the case of removing the same concentration of COD, the "narrow-channel electrocatalytic Fenton oxidation, narrow-channel electrochemical oxidation and pH adjustment" coupling process is the most efficient and economical.

Embodiment 6

The wastewater to be treated and the test conditions in the present embodiment are basically the same as those in Embodiment 4. The difference is that the anode-cathode spacing of the tubular reactor used in the narrow-channel electrochemical oxidation stage is fixed to 1 cm, and the removal rate of COD is monitored respectively when the electrode spacing of the electrocatalytic Fenton oxidation section is 1, 2, 3, 5, 10, and 30 cm.

Figure 6:
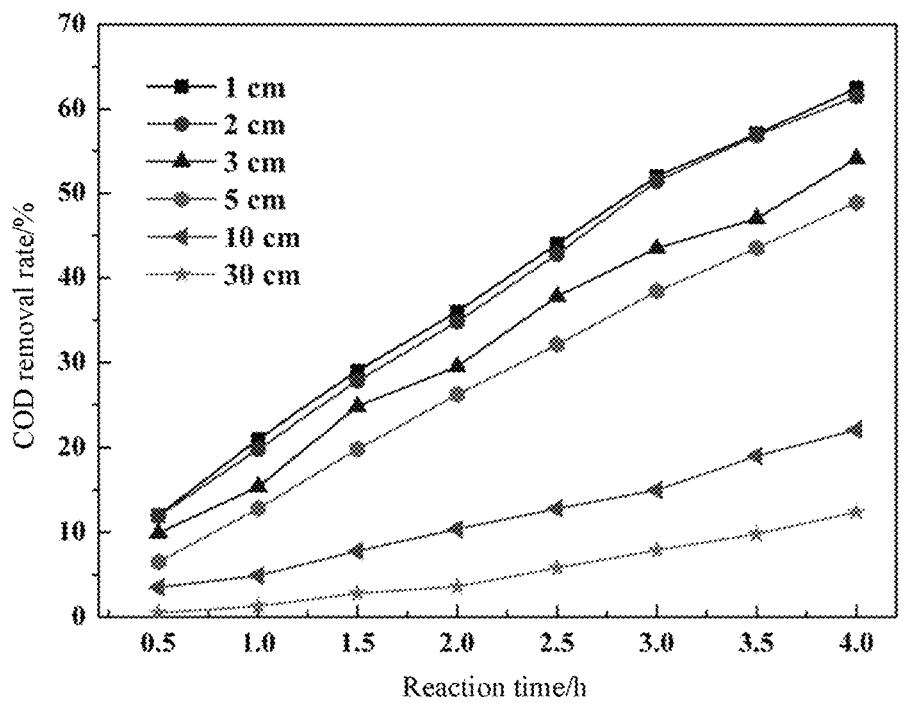
FIG. 6 is a diagram showing a comparison of the COD removal rates in the narrow-channel electrocatalytic Fenton oxidation step with different anode-cathode spacings within the same treatment time.

As shown in FIG. 6, it can be seen from the experimental results that the electrode spacing of the electrocatalytic Fenton oxidation section has a great influence on the removal rate of COD. When the anode-cathode spacing is 1, 2, 3, and 5 cm, the COD removal rate is increased by 30-50% compared with the spacing of 10 and 30 cm. This shows that the oxygen produced by the anode can be fully in contact with the cathode when the spacing is less than 5 cm, and the smaller the anode-anode spacing, the more stable the concentration of hydrogen peroxide produced. When the spacing is larger than 10 cm, the cathode cannot make full use of the oxygen produced by the anode, that is, the production of hydrogen peroxide is unstable and the concentration is low, and the corresponding COD removal rate will be much lower than the working condition where the anode-cathode spacing is less than or equal to 5 cm.

Embodiment 7

The wastewater to be treated and the test conditions in the present embodiment are basically the same as those in Embodiment 6. The difference is that the anode-cathode spacing in the electrocatalytic Fenton oxidation section is 3 cm, the anode-cathode spacing of the tubular reactor used in the narrow-channel electrochemical oxidation stage is 1 cm, and the COD removal rate of the electrocatalytic Fenton oxidation sections using a plate electrode and a tubular electrode is monitored respectively.

Figure 7:
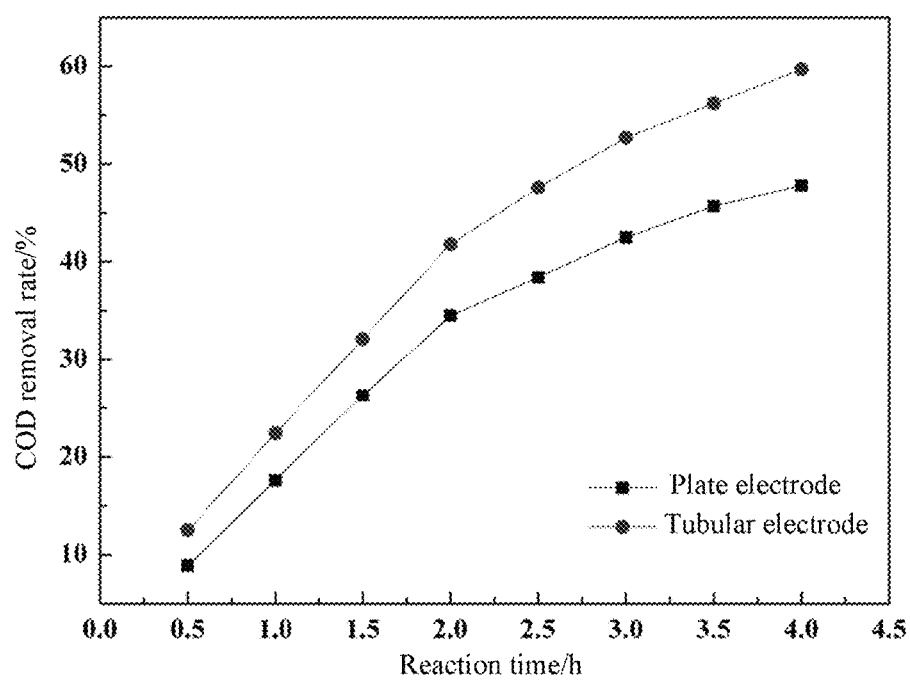
FIG. 7 is a diagram showing a comparison of the COD removal rates in the narrow-channel electrocatalytic Fenton oxidation step respectively using tubular and plate electrodes within the same treatment time.

As shown in FIG. 7, it can be seen from the above experimental results that in the electrocatalytic Fenton oxidation section, the anode-cathode spacing is enabled to be 3 cm, the plate electrode and the tubular electrode are used respectively, and the COD removal rate of the tubular electrode is 10-20% higher than that of the plate electrode. The phenomenon can be explained by the fact that when the anode-cathode spacing is the same, the removal efficiency in an open space of the plate electrode is lower than the removal efficiency in a closed pressurized space of the tubular electrode. This can also be explained as the influence of mass transfer on the electrochemical reaction process being crucial.

In the above embodiment, the mass concentration of $H_2O_2$ produced by oxygen, produced at the anode, reacting at the cathode in the electrocatalytic Fenton oxidation step, obtained by real-time monitoring is in the range of 100-5,000 mg/L, wherein the concentration of $H_2O_2$ varies with the current density and the anode-cathode spacing.

It is worth noting that, since the coupling process adopted in the embodiments is a serial circulating treatment process, circulating treatment in a sequence of a narrow-channel electrocatalytic Fenton oxidation step, a narrow-channel electrochemical oxidation step and a pH adjustment step, or circulating treatment in a sequence of a narrow-channel electrocatalytic Fenton oxidation step, a pH adjustment step and a narrow-channel electrochemical oxidation step can both achieve the objective of the present invention.

It should be noted that, due to the certain errors in the experiments carried out in different batches for the same wastewater under laboratory conditions, the COD removal efficiency for each batch under the same conditions fluctuates. In the embodiments of the present invention, the COD removal efficiency being not completely the same under the same conditions in different embodiments is a situation within the experimental error.

The present invention and implementations thereof have been exemplarily described in the foregoing content, the description is not limiting. The content shown in the embodiments and the accompanying drawings is merely one of the implementations of the present invention, and an actual structure or situation is not limited thereto. Therefore, under the teaching of the present invention, any structure and embodiment similar to the technical solution that are made by those skilled in the art without creative efforts and without departing from the spirit of the present invention shall all fall within the protection scope of the present invention.

What is claimed is:

1. An electrocatalytic Fenton oxidation-electrochemical oxidation coupling process for efficient treatment of chemical wastewater, comprising an electrocatalytic Fenton oxidation step, an electrochemical oxidation step, and a pH adjustment step,
    wherein an electrode in the electrocatalytic Fenton oxidation step is a tubular electrode,
    wherein a current density is controlled to be 8-15 mA/cm$^2$ and a spacing between an anode and a cathode is controlled to be 1-3 cm simultaneously in the electrocatalytic Fenton oxidation step so that oxygen produced at the anode reacts at the cathode to produce $H_2O_2$ with a mass concentration of 100-5,000 mg/L.

2. The electrocatalytic Fenton oxidation-electrochemical oxidation coupling process for efficient treatment of chemical wastewater according to claim 1, wherein in the electrochemical oxidation step, a narrow-channel electrochemical oxidation step with a spacing between the cathode and the anode less than or equal to 5 cm is adopted.

3. The electrocatalytic Fenton oxidation-electrochemical oxidation coupling process for efficient treatment of chemical wastewater according to claim 2,
    anode and cathode materials in the electrocatalytic Fenton oxidation step are as follows respectively:
    anode: a composite microporous iron electrode formed by pressing, roasting and molding of iron powder; cathode: a modified carbon material or stainless steel electrode; and/or
    an electrode in the electrochemical oxidation step is a tubular electrode, and anode and cathode materials are as follows respectively:
    anode: an electrode with an oxygen evolution potential greater than 1.5 V; and
    cathode: a stainless steel or titanium-based or modified carbon material.

4. The electrocatalytic Fenton oxidation-electrochemical oxidation coupling process for efficient treatment of chemical wastewater according to claim 3, wherein the coupling process adopts circulating treatment in a sequence of a narrow-channel electrocatalytic Fenton oxidation step, a narrow-channel electrochemical oxidation step and a pH adjustment step, or circulating treatment in a sequence of a narrow-channel electrocatalytic Fenton oxidation step, a pH adjustment step and a narrow-channel electrochemical oxidation step.

5. The electrocatalytic Fenton oxidation-electrochemical oxidation coupling process for efficient treatment of chemical wastewater according to claim 2, wherein in the electrocatalytic Fenton oxidation step, the current density and the anode-cathode spacing are adjusted, and the concentration of $H_2O_2$ is monitored in real time, so that a mass concentration ratio of $\Delta COD$ to $H_2O_2$ is 1:(0.5-1), and a molar ratio of iron(II) to $H_2O_2$ is 1:(8-12).

6. The electrocatalytic Fenton oxidation-electrochemical oxidation coupling process for efficient treatment of chemical wastewater according to claim 5, wherein the coupling process adopts circulating treatment in a sequence of a narrow-channel electrocatalytic Fenton oxidation step, a narrow-channel electrochemical oxidation step and a pH adjustment step, or circulating treatment in a sequence of a narrow-channel electrocatalytic Fenton oxidation step, a pH adjustment step and a narrow-channel electrochemical oxidation step.

7. The electrocatalytic Fenton oxidation-electrochemical oxidation coupling process for efficient treatment of chemical wastewater according to claim 2, wherein in the electrochemical oxidation step, a current density in the electrochemical oxidation is controlled to be 1-20 $mA/cm^2$ and the anode-cathode spacing is controlled to be 0.5-3 cm simultaneously.

8. The electrocatalytic Fenton oxidation-electrochemical oxidation coupling process for efficient treatment of chemical wastewater according to claim 7, wherein the coupling process adopts circulating treatment in a sequence of a narrow-channel electrocatalytic Fenton oxidation step, a narrow-channel electrochemical oxidation step and a pH adjustment step, or circulating treatment in a sequence of a narrow-channel electrocatalytic Fenton oxidation step, a pH adjustment step and a narrow-channel electrochemical oxidation step.

9. The electrocatalytic Fenton oxidation-electrochemical oxidation coupling process for efficient treatment of chemical wastewater according to claim 2, wherein the coupling process adopts circulating treatment in a sequence of a narrow-channel electrocatalytic Fenton oxidation step, a narrow-channel electrochemical oxidation step and a pH adjustment step, or circulating treatment in a sequence of a narrow-channel electrocatalytic Fenton oxidation step, a pH adjustment step and a narrow-channel electrochemical oxidation step.

10. The electrocatalytic Fenton oxidation-electrochemical oxidation coupling process for efficient treatment of chemical wastewater according to claim 1, wherein the coupling process adopts circulating treatment in a sequence of a narrow-channel electrocatalytic Fenton oxidation step, a narrow-channel electrochemical oxidation step and a pH adjustment step, or circulating treatment in a sequence of a narrow-channel electrocatalytic Fenton oxidation step, a pH adjustment step and a narrow-channel electrochemical oxidation step.

11. The electrocatalytic Fenton oxidation-electrochemical oxidation coupling process for efficient treatment of chemical wastewater according to claim 1, wherein the coupling process adopts circulating treatment in a sequence of a narrow-channel electrocatalytic Fenton oxidation step, a narrow-channel electrochemical oxidation step and a pH adjustment step, or circulating treatment in a sequence of a narrow-channel electrocatalytic Fenton oxidation step, a pH adjustment step and a narrow-channel electrochemical oxidation step.

* * * * *